United States Patent
Zinser

(10) Patent No.: US 6,534,208 B1
(45) Date of Patent: Mar. 18, 2003

(54) DEVICE FOR GENERATING ELECTRICAL ENERGY, HAVING A FUEL CELL

(75) Inventor: Wolfgang Zinser, Kirchheim/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 174 days.

(21) Appl. No.: 09/697,684

(22) Filed: Oct. 27, 2000

(30) Foreign Application Priority Data

Oct. 27, 1999 (DE) .......................................... 199 51 584

(51) Int. Cl.[7] .................................................. H01M 8/04
(52) U.S. Cl. .............................. 429/9; 429/13; 429/23
(58) Field of Search .............................. 429/9, 13, 23, 429/24

(56) References Cited

U.S. PATENT DOCUMENTS 4,087,976 A * 5/1978 Morrow et al. ......... 204/DIG. 4
4,677,040 A * 6/1987 Specht ........................ 429/14
5,334,463 A    8/1994 Tajima et al. .................. 429/9
5,485,064 A * 1/1996 Arnaud et al. ............... 318/139
5,645,950 A * 7/1997 Benz et al. .................... 429/13
5,968,680 A * 10/1999 Wolfe et al. .................. 429/13

FOREIGN PATENT DOCUMENTS

DE          43 22 767       1/1995
DE          198 10 468      9/1999

* cited by examiner

Primary Examiner—Patrick Ryan
Assistant Examiner—Gregg Cantelmo
(74) Attorney, Agent, or Firm—Crowell & Moring LLP

(57) ABSTRACT

A device for generating electrical energy, having a fuel cell. A unit includes two rigidly coupled synchronous machines to drive compressors and other additional units. During the starting phase, the idling synchronous machine is energized and, at the end of the starting phase, is changed over to motor operation, to thereby drive the compressors and other additional units and the first synchronous machine, which is set to generator operation.

12 Claims, 2 Drawing Sheets

DEVICE FOR GENERATING ELECTRICAL ENERGY, HAVING A FUEL CELL

This application claims the priority of German Patent Document 199 51 584.0, filed Oct. 27, 1999, the disclosure of which is expressly incorporated by reference herein.

BACKGROUND AND SUMMARY OF THE INVENTION

Device for generating electrical energy, having a fuel cell, which is assigned additional units for starting and for operation, and method of operating the device.

The invention relates to a device for generating electrical energy, having a fuel cell, which is fed with an oxidant by a compressor, and having a high-pressure compressor intended to supply a fuel-gas production system with air. In addition, the invention relates to a method of operating a device of the above-described type.

A circuit arrangement for supplying electrical energy to a network containing a fuel cell and an accumulator circuit has been disclosed, in which the accumulator supplies the energy during the starting operation (German Patent DE 198 10 468). The accumulator circuit in this arrangement is connected via one or more DC/DC converters to the fuel-cell network, to which the drives of auxiliary units, such as a compressor for delivering the combustion agent and/or air, are also connected. At the beginning of a starting operation, the accumulator supplies the energy for the auxiliary units. After the starting operation, that is, say during rated operation, the accumulator is charged via the DC/DC converter.

A method is known for starting a fuel-cell vehicle, which is driven by an electrical drive unit which is fed by the fuel cell. The fuel-cell vehicle contains a fuel cell which is fed with a combustion agent, for example hydrogen, via a line in which a valve and a pressure regulator are arranged. The fuel cell is fed with an oxidant, for example air through another line, in which an air filter, an air-mass meter and a compressor are arranged. A starter motor and an electric motor drive the compressor. In order to start the fuel cell, the starter motor is supplied with power by a starter battery. During normal operation, the fuel cell supplies the energy needed to operate the electric motor. By means of a current controller, the is rotational speed of the electric motor, and therefore the speed of the compressor, are set in order to influence the oxidant mass flow which, in turn, influences the output from the fuel cell (German DE 43 22 767 A1).

The fuel cell is supplied with the oxidant, for example air, by a compressor both during the starting phase and during normal operation. The fuel gas needed for the operation of the fuel cell, in particular hydrogen, is often produced from hydrocarbons. The fuel-gas production system needs air, which is fed by a high-pressure compressor into the fuel-gas production system in a manner known per se. Either DC motors or AC motors or three-phase motors need to be used for the compressor drives. AC motors or three-phase motors have to be connected to the DC network of the fuel cell via inverters. During the starting phase of the fuel cell, a starter battery supplies the auxiliary or additional units, such as a compressor or a high-pressure compressor, with energy. In order to supply the fuel cell with cooling water which, although it is not needed to start the fuel cell, is needed during operation under relatively high loads, a pump is necessary, and is driven, for example, by an AC or three-phase motor connected to the electrical outputs of the fuel cell via an inverter.

With the auxiliary units, such as pumps and compressors, driven by individual motors, possibly via inverters, the result is a relatively complicated arrangement with a corresponding large space requirement and a relatively high weight. As a result of this arrangement, the overall efficiency of the fuel-cell system is also considerable reduced.

The invention is based on solving the problem of further developing a device for generating electrical energy, having a fuel cell, which is assigned additional units for starting and for operation, to the extent that, by means of a combination of the drives needed for the additional units, the device is simplified and the overall efficiency of the device is improved. In addition, the object of the invention is to specify a method of operating such a device.

According to the invention the problem is solved by a unit having a first and a second synchronous machine, with the two synchronous machines being coupled rigidly to each other as a unit and connected via an inverter to a storage battery, and for the second machine to be connected via an inverter to the electrical outputs of the fuel cell, by the unit being mechanically rigidly coupled at least to the high-pressure compressor and the compressor and by the inverters and the field windings of the synchronous machines being connected to a control unit which, during starting operation, controls the first synchronous machine as a motor and the second machine at idle and, after the end of the starting operation, controls the second machine as a motor and the first as a generator. With the device according to the invention, individual motor drives are dispensed with. The first synchronous machine operates as a generator after the end of the starting phase of the fuel cell and charges the storage battery and supplies loads which are connected to the storage battery. The starting phase or the starting operation is concluded when the fuel cell is ready to operate and outputs the appropriate operating voltage. The loads can be motors, heating resistances and so on. The circuits connected to the fuel cell are electrically isolated from the circuits connected to the storage battery, so that a DC/DC converter with a large step-up ratio for the different voltages of the fuel-cell network and the storage battery network is rendered superfluous. In the starting phase, no load is connected to the electrical outputs of the fuel cell, so that the output fed from the storage battery to the synchronous motor, to operate the compressor and the high-pressure compressor, is adequate to bring the fuel cell into the operating state desired for load operation. To supply the fuel-gas device with air, it is sufficient for the high-pressure compressor to have an output which is smaller by about one power of ten than the compressor.

In an expedient embodiment, the high-pressure compressor is connected to the unit via a step-down gear mechanism, in order to permit the motors driven by the same unit to operate in the most favourable rotational speed range.

In a preferred embodiment, the shaft of the high-pressure compressor is rigidly coupled to a water pump and a bypass equipped with a controllable valve is connected in parallel with the water pump and the water pump is connected by an output line to the cooling device of the fuel cell, whose cooling-water feed can be shut off by a further valve.

The water pump for cooling the fuel cell is driven by the same unit as the compressors, which eliminates the need for a separate motor. During the starting of the fuel cell, the cooling-water feed to the fuel cell is shut off by a valve and the bypass is switched through.

It is expedient if the field windings of the synchronous machines are each connected to the storage battery via solid-state switches. The field windings are therefore fed via the network connected to the storage battery.

The first synchronous machine preferably has about 10 to 20% of the output of the second synchronous machine. This output is adequate for driving the compressor, the high-pressure compressor and the second synchronous machine at idle during the starting phase of the fuel cell, as well as for charging the storage battery and feeding the loads operated on the network of the storage battery after the starting phase.

In a preferred embodiment, the device is arranged in a vehicle, which has at least one electric motor which can be connected to the fuel cell for driving at least two wheels on the same axle. The device is particularly suitable for motor vehicles having at least one driving motor, in which short starting times can be achieved. Because of the starting of the motor vehicles, in particular during frequent journeys, short starting times are important in order to reduce annoying waiting times until the start of a journey.

The unit expediently contains three slip rings which are connected to the field windings of the synchronous machines and of which one is common to both field windings, which results in a saving in slip rings.

The present invention provides a method of operating a device having a fuel cell which is fed with an oxidant, in particular air, as well as by a compressor, and having a high-pressure compressor intended to supply a fuel-gas production system with air, as well as a unit having two synchronous machines which are rigidly connected to each other and of which one can be connected via an inverter to the storage battery and the second can be connected to the electrical outputs of the fuel cell. The two machine are mechanically connected at least to the high-pressure compressor and the compressor, and includes that according to the invention, in order to start the fuel cell, the first synchronous machine is energized and operated as a motor, with the second synchronous machine idling, to drive the compressor and the high-pressure compressor. The feed of fuel gas is opened, and the second synchronous machine, as a generator, is energized to a voltage below the voltage output by the fuel cell in operation. After the operating voltage of the fuel cell has been reached, the second synchronous machine has the fuel-cell voltage applied to it at this voltage located below the fuel-cell voltage and, as a motor, drives the compressor and high-pressure compressor and the first synchronous machine.

In the method according to the invention, during the starting operation or the starting phase, the first synchronous machine drives additional units which effect a rapid start. That is, brings the fuel cell in a short time into a state in which it outputs its desired voltage and can output the desired power. During the starting operation, the second synchronous machine is energized to an output voltage which is somewhat lower than the fuel-cell output voltage in rated operation. As soon as the fuel-cell voltage has been reached, it is applied, via a switch and the inverter, to the second synchronous machine, as a result of which the second synchronous machine changes virtually jolt-free from generator operation to motor operation. By means of the second synchronous machine, operating as a motor, the first synchronous machine is changed over to generator operation, in which it charges the storage battery and supplies the electrical loads connected to the storage battery network with power.

It is expedient for the first synchronous machine to have field current applied to it first and then for power to be fed into the stator winding through the inverter. This is beneficial for the production of an appropriate starting torque.

In a preferred embodiment, a water pump is connected to the high-pressure compressor in a cooling circuit of the fuel cell and, during the stator operation of the fuel cell, is changed over to bypass operation, the feed to the cooling circuit to the fuel cell being shut off. The fuel cell is not cooled in the starting phase, in which the heat produced in it is used to heat it up to operating temperature. Only under load conditions in which a high development of heat takes place is the fuel cell supplied with cooling water.

The invention is explained in more detail in the following text using an exemplary embodiment which is illustrated in a drawing and from which further details, features and advantages emerge.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
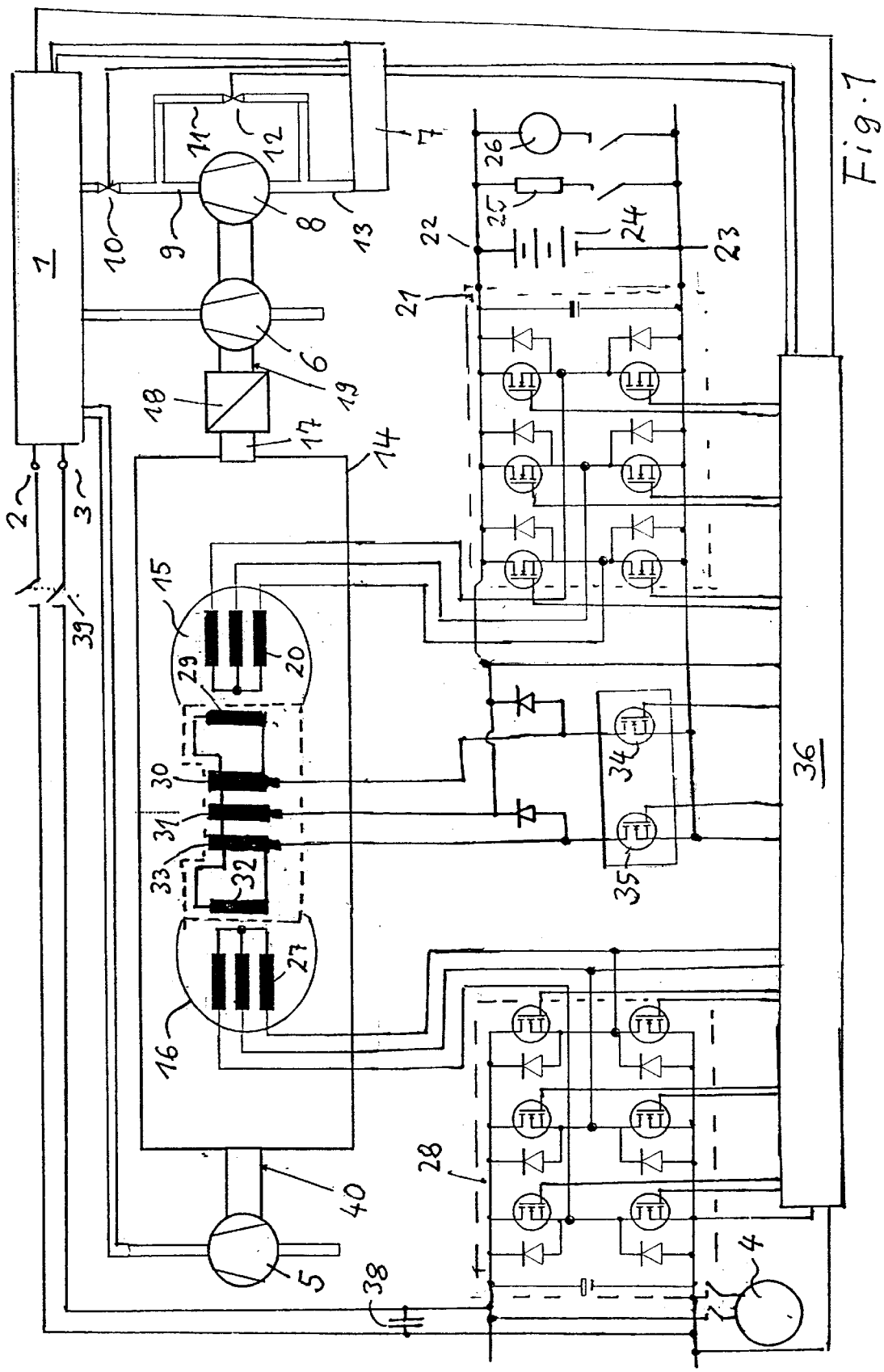
FIG. 1 shows a device for generating electrical energy having a fuel cell and having additional units for operating the fuel cell and having a storage battery, in schematic form.

A device which is particularly suitable for a vehicle for generating electrical energy contains a fuel cell 1, which has electrical outputs 2, 3, to which consumers of electrical energy can be connected. If the device is located in a vehicle, then the outputs 2, 3 have connected to them, via a switch or controller which is not specifically illustrated, a drive motor 4 for the drive wheels of the vehicle. If required, further motors and switches can also be connected to the outputs 2, 3 or to an electrical network which is connected to the outputs 2, 3 and carries the output voltage from the fuel cell 1.

In order to supply the fuel cell 1 with an oxidant, especially air, a compressor 5 is provided, which is connected to the fuel cell 1 via a line. The compressor 5 is designed for an output which is sufficient to supply the fuel cell 1 with the oxidant in the envisaged operating range with electrical loading of the fuel cell.

A high-pressure compressor 6 for supplying a fuel-gas production system with air is provided. The fuel-gas production system, which, for example, produces hydrogen for the fuel cell from methanol, needs the air for CO oxidation, partial oxidation, methanol metering and so on. A fuel-gas production system of this type is known per se.

The equipment for supplying the fuel cell 1 with fuel gas is not illustrated in the drawing. In order to feed in the fuel m gas, for example hydrogen, means known per se are used. Means for supplying a fuel cell with fuel gas are described in German Patent DE 43 22 767 A1 or U.S. Pat. No. 5,334,463.

When the fuel cell 1 is loaded, it is cooled in order to achieve a favourable operating temperature. The fuel cell 1 contains a cooling device (not specifically illustrated) for cooling water, which is taken from a tank 7 by a water pump 8 via a line 13 and, via a further line 9, in which there is a control valve 10, is fed to the cooling device of the fuel cell 1 if a specific operating temperature is to be maintained in spite of relatively high loading. Connected in parallel with the water pump 8 is a parallel branch 11 or bypass, in which there is a further valve 12. In the starting phase, when the fuel cell is to be heated up as quickly as possible to operating temperature by the process heat generated by it itself, no cooling water is fed into the fuel cell. When the water pump 8 is running, the infeed is prevented by the valve 12 in the parallel branch 11 being opened.

In order to drive the compressor 5, the high-pressure compressor 6 and the water pump 8, a unit 14, which is also referred to as a drive unit in the following text, is provided. The unit has two synchronous machines 15, 16, which are rigidly coupled to each other. In addition, the unit is rigidly coupled to the compressor 5 via a shaft 40. Furthermore, a shaft 17 of the unit 14 is connected to a step-down gear mechanism 18, whose low-speed shaft 19 is rigidly connected to the high-pressure compressor 6 and the water pump 8.

The synchronous machine 15 has a three-phase stator winding 20 which, for example, is star-connected. The terminals (not specifically shown) of the stator winding 20 are in each case connected to outputs of an inverter 21 which, in a manner known per se as a bridge circuit, has CMOS transistors for example as switches, with freewheeling diodes connected in parallel. The electrical components of the inverter 21 are not specifically shown. The inverter 21 is connected to the poles 22, 23 of a storage battery 24 or an accumulator, which feeds an on-board network which can operate at, for example, 12 V or 36 V. The stator winding is designed for the on-board network voltage.

Still further loads in the vehicle are connected to the poles 22, 23 of the storage battery 24. These may be, for example, a heating resistance 25 and motors, of which only one is illustrated and designated by 26. The loads 25, 26 are connected, via switches which are not specifically illustrated, to the electrical network connected to the poles 22, 23. The switches are closed as required. The loads may be, for example, drive motors for the sliding roof, windscreen wipers, window lifters and so on.

The synchronous machine 16 likewise has a three-phase stator winding 27, which is star-connected, for example, and designed for the fuel-cell voltage. The terminals (not specifically shown) of the stator winding 27 are connected to outputs of an inverter 28, which can likewise be designed as a bridge circuit with CMOS transistors as switches in the bridge branches. The inverter 28 is connected to the terminals 2, 3 of the fuel cell 1 via a switch 39.

The synchronous machine 15 has a field winding 29 which is connected to two slip rings 30, 31 on the machine shaft. The synchronous machine 16 has a field winding 32 which is connected to a slip ring 33 and the slip ring 31, which is therefore common to both synchronous machines 15, 16.

The slip ring 31 is connected, via a brush which is not specifically shown, to the pole 22 of the storage battery 24. The slip rings 30, 33 are each connected, via a brush which is not specifically shown but is in series with a solid-state switch 34 or 35, to the pole 23 of the storage battery 24.

The control electrodes of the solid-state switches 34, 35, the solid-state switches of the two inverters 21, 28, the actuators of the valves 10, 12, at least one temperature sensor in the cooling circuit of the fuel cell, the outputs 2, 3, the poles 22, 23 and further actuators or components of the fuel-gas production device (not shown) are connected to a control circuit 36 or control unit, which also monitors the voltages at the poles 22, 23 and the outputs 2, 3. It is also possible for further control elements or switching elements, for example belonging to loads in the network of the storage battery, to be connected to the control circuit 36. Likewise, the control circuit 36 has components which, when an ignition or starting key (not illustrated) is operated, starts the inverter 21 operating in such a way that the synchronous machine 15, as a motor, runs up to its rated rotational speed.

The synchronous machines 15, 16 can be designed as salient-pole machines or those with cylindrical rotors. For high rotational speeds, machines with cylindrical rotors are predominantly used.

In the starting phase, the synchronous machine 15 is used as a motor and can have a lower output than the synchronous machine 16.

For example, the output of the synchronous machine 16 is more than five times as high as that of the synchronous machine 15. The rotational speeds of the synchronous machines 15, 16 are, for example, in the range above 10 000 rev./min. The step-down ratio of the gear mechanism 18 can be 4/1. In order to start up the device illustrated in FIG. 1 for generating electrical energy with the fuel cell 1, which consists for example of a stack of individual fuel-cell modules, a key is operated which causes the control circuit 36 to close the switch 34 and to drive the inverter 21 in such a way that the synchronous machine 15, as a motor, runs up to rated rotational speed and maintains this speed for a certain time, until the fuel cell 1 has reached its operating state, that is to say outputs its operating voltage. Simultaneously with the driving of the inverter 21, the means for feeding fuel into the fuel cell are started up, the valve 10 is closed and the valve 12 is opened. The starting phase ends when the fuel cell has reached its operating voltage. While the synchronous machine 15 is running up, including the time following that which was mentioned previously, the synchronous machine 16 idles. In the starting phase, the fuel cell 1 is set into operation by feeding the oxidant in through the compressor 5 and through the fuel gas from the fuel-gas production device, which is supplied with air by the high-pressure compressor. The fuel cell 1 heats up as a result of the process heat produced and generates a DC voltage at the outputs 2 and 3. The energy needed for the units for starting up the fuel cell and until the latter is ready to operate is taken from the storage battery 24.

The control circuit 36 detects the point at which the fuel cell 1 has reached its operational readiness. At this time, or even previously, when the fuel cell has not yet reached its operating voltage, the control circuit 36 feeds field current into the field winding 32. The synchronous machine 16 then operates as an idling generator, whose output voltage is monitored by the control circuit 36 and set to a value which is somewhat lower than the voltage present at the output of the inverter 28 at the operating voltage of the fuel cell 1.

Once the fuel cell 1 has reached its envisaged operating voltage, the control circuit 36 then operates the switch 39 and the switches of the inverter 28, so that the stator winding of the synchronous machine 16 has the voltage from the fuel cell 1 applied to it. The generator voltage in this case corresponds to a back-EMF. The synchronous machine 16 therefore changes quickly from generator to motor operation, after which the synchronous machine drives the compressor 5 and the high-pressure compressor 6 and the pump 8. As a result of the transition of the synchronous machine 16 to motor operation, the synchronous machine 15 is automatically changed over to generator operation, in which it feeds charging current to the storage battery 24, given appropriate control of the field current by the control circuit 36. The level of the voltage in the network having the storage battery 24 and, accordingly, the charging of the storage battery 24, are matched to the requirements by setting the field current in the field winding 29. When the loads 25, 26 are operating, it is expedient to supply the loads with current from the synchronous machine 15 by means of appropriate excitation of the synchronous machine 15, in order that the storage battery 24 is not discharged.

Figure 2:
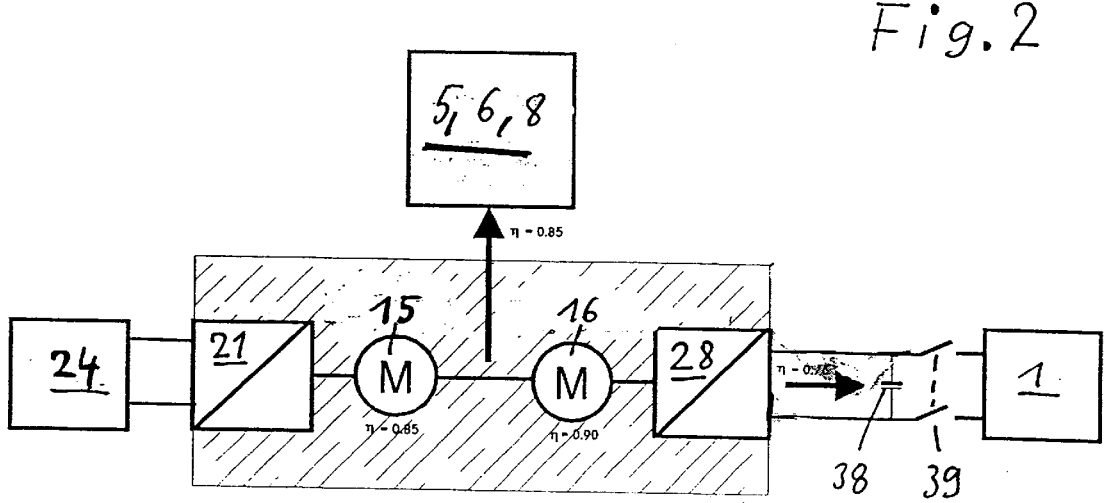
FIG. 2 shows an overall circuit diagram with essential components of the device shown in FIG. 1 in the starting-phase state of the fuel cell.

In FIG. 2, in an overall picture having the essential components of the device, the state of the device illustrated in FIG. 1 in the starting phase is illustrated. The individual components of the device which are shown in FIG. 2 have had their efficiencies indicated. It is possible to obtain a synchronous machine 16 for the voltage generated by the fuel cell 1 with an efficiency of 90% or more, including the efficiency of the inverter 28. For the synchronous machine 15, designed for the voltage of the storage battery, an efficiency of 85% or more is possible, including the efficiency of the inverter 21.

In the starting phase, in which the fuel cell 1 is electrically isolated from the inverter 28 by the open switch 39, the efficiency of the output from the synchronous machine 15 is 85%, which is then available at the compressors 5, 6 and the water pump 8. A system capacitor 38 in the network of the fuel cell is loaded by the inverter 28 with an efficiency of 0.76.

The compressors 5, 6 and the water pump 8 are illustrated in FIG. 2 as a block bearing the reference numbers 5, 6, 8. The efficiency of a device with individual motor drives, which are connected to the fuel-cell network and have DC/DC converters connected upstream, is lower.

Figure 3:
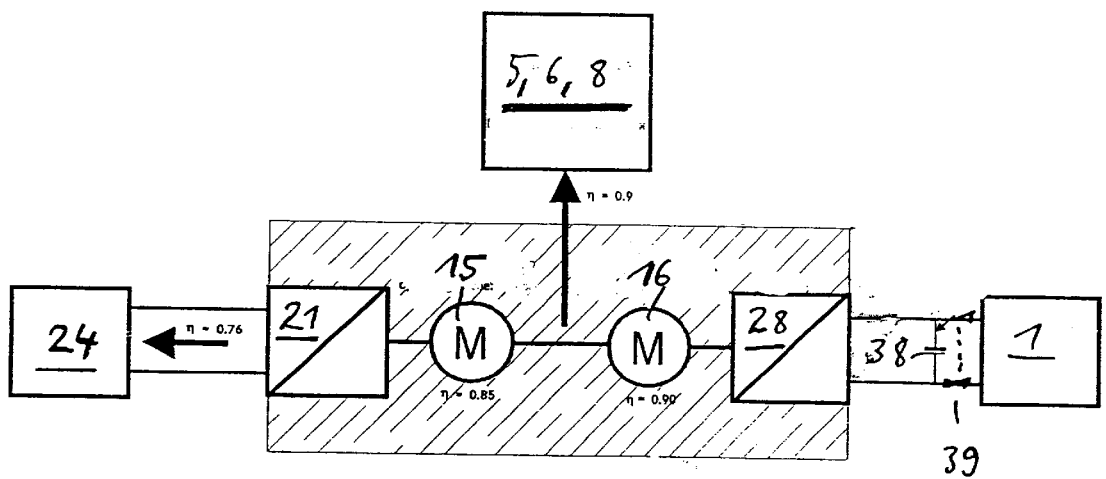
FIG. 3 shows an overall circuit diagram with essential components of the device shown in FIG. 1 in the state after the operation of the fuel cell has been assumed.

In the normal operation of the fuel cell 1, which is illustrated in FIG. 3 in an overall circuit diagram with the essential components of the device according to FIG. 1, the high efficiency of 90% of the synchronous machine 16 is present, while the storage battery 24 is charged via the synchronous machine 15 with a low efficiency of about 0.76. By contrast, as a result of the efficiency of 90%, an output for the drives is available which is referred to a significantly higher output than the charging output. In the case of the above-described device with individual motors, the motor efficiency would be approximately equal to that during starting operation, that is to say significantly lower. Only the charging efficiency would be somewhat higher, by comparison.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for generating electrical energy, having a fuel cell, which is fed with an oxidant by a compressor, and having a high-pressure compressor for supplying a fuel-gas production system with air, said device comprising:

a unit having first and second synchronous machines rigidly coupled to each other, each of said first and second synchronous machine having field windings wherein said first machine is connected via a first inverter to a storage battery, and wherein said second machine is connected via a second inverter to electrical outputs of a fuel cell:

first high-pressure compressor and a second compressor rigidly coupled to said unit, wherein said first and second inverters and said field windings of the respective first and second synchronous machines are connected to a control circuit arrangement which, during a starting operation, controls the first synchronous machine as a motor and the second machine at idle and, after completion of the starting operation, controls the second machine as a motor and the first machine as a generator.

2. The device according to claim 1, wherein a shaft of the first high-pressure compressor is rigidly coupled to a water pump and a bypass equipped with a controllable valve is connected in parallel with said water pump and said water pump is connected by an output line to a cooling device of the fuel cell via a valve for controlling a cooling-water feed to the fuel cell can be shut off.

3. The device according to claim 1, wherein the field windings of each of the synchronous machines are each connected to the storage battery via solid-state switches.

4. The device according to claim 1, wherein the first high-pressure compressor is connected to the unit via a step-down gear mechanism.

5. The device according to claim 1, wherein the first synchronous machine has approximately 10 to 20% of the output of the second synchronous machine.

6. The device according to claim 1, wherein a rotational speed of the synchronous machines is 12 000 rev./min.

7. The device according to claim 1, wherein an efficiency of the first synchronous machine is approximately 85%, and an efficiency of the second machine is approximately 90% at rated output.

8. The device according to claim 1, wherein energy from said fuel cell is supplied to a drive motor of a vehicle.

9. The device according to claim 1, wherein the unit has three slip rings which are connected to field windings of the first and second synchronous machines and one of said slip rings is common to both field windings.

10. A method of operating a device for generating electrical energy, having a fuel cell which is fed with an oxidant, in particular air, by a first compressor, and having a second high-pressure compressor for supplying a fuel-gas production device with air, a unit having a first and a second synchronous machine rigidly coupled together and with the first of the two synchronous machines connected via a first inverter to a storage battery, and with the second machine connected via a second inverter to outputs of the fuel cell, and the unit being mechanically rigidly coupled at least to said second high-pressure compressor and to the first compressor, said method comprising the steps of:

in order to start the fuel cell, energizing the first synchronous machine and operating it as a motor with the second synchronous machine idling in order to drive the first compressor and the second high-pressure compressor whereby feeding of a fuel gas to the fuel cell is opened;

operating the second synchronous machine as a generator up to a voltage below the operating voltage of the fuel cell;

after the operating voltage of the fuel cell has been reached, applying the second synchronous machine with the operating voltage and wherein the second machine, operating as a motor, drives the compressor for the delivery of oxidant, operation of the second high-pressure compressor and operation of the first synchronous machine.

11. The method according to claim 9, wherein the first synchronous machine initially receives field current and is subsequently connected by a stator winding to the inverter fed by the storage battery.

12. A method according to claim 9, wherein a water pump is connected to the high-pressure compressor in a cooling circuit of the fuel cell, and, during the starting phase of the fuel cell, the water pump is set to bypass operation and the feed to the cooling device of the fuel cell is shut off.

* * * * *